United States Patent
Watanabe

[11] Patent Number: 5,743,133
[45] Date of Patent: Apr. 28, 1998

[54] LOAD DETECTABLE VALVE

[75] Inventor: Susumu Watanabe, Hiratsuka, Japan

[73] Assignee: Nippon Gear Co., Ltd., Kanagawa-ken, Japan

[21] Appl. No.: 542,938

[22] Filed: Oct. 13, 1995

[30] Foreign Application Priority Data

Mar. 24, 1995 [JP] Japan .................. 7-065436

[51] Int. Cl.$^6$ .................................................. G01L 5/00
[52] U.S. Cl. .................................................... 73/168
[58] Field of Search ....................................... 73/168

[56] References Cited

U.S. PATENT DOCUMENTS

| | | | |
|---|---|---|---|
| 4,805,451 | 2/1989 | Leon | 73/168 |
| 4,977,782 | 12/1990 | Stohr et al. | 73/168 X |
| 5,029,597 | 7/1991 | Leon | 73/168 X |
| 5,142,906 | 9/1992 | Smith | 73/168 |
| 5,257,535 | 11/1993 | Evans | 73/168 |
| 5,546,817 | 8/1996 | Heiman | 73/168 X |

FOREIGN PATENT DOCUMENTS 3-16547  5/1989  Japan .

*Primary Examiner*—Diego F.F. Gutierrez
*Assistant Examiner*—Willie Morris Worth
*Attorney, Agent, or Firm*—Brinks Hofer Gilson & Lione

[57] ABSTRACT

In a valve used in a nuclear power plant, a valve body from which a valve stem projects upwards is connected with a valve drive device for driving the valve stem by a hollow cylinder which is provided concentrically with the valve stem. On the hollow cylinder, strain gauges are attached to detect both torque and thrust, thereby detecting load exactly.

4 Claims, 3 Drawing Sheets

LOAD DETECTABLE VALVE

The present invention relates to a load detectable valve, and in particular, to a large-sized load detectable valve used, for example, in a nuclear power plant.

FIG. 3 is a perspective view which illustrates one example of a conventional large-sized electric valve used in a nuclear power plant. 1 denotes a valve body of a known gate valve in which an inner valve element (not shown) opens and closes by moving an upward-projecting valve stem 2 which moves up and down, and at the upper end of a valve casing 3, there is a forked valve yoke 4 to surround the valve stem 2.

On the upper surface 4a of the valve yoke 4, a valve drive device 6 is connected to rotate a stem nut by drive force of a motor 5, thereby moving up and down the valve stem which has a threaded portion (not shown) which is engaged with the stem nut. 7 denotes a manually-operated handle for driving the valve stem 2 instead of the motor 5 when it is out of order.

In addition to the above, there is provided a butterfly valve in which a valve element is opened and closed by rotating a valve stem without going up and down. As means for detecting load which acts to such a valve, there are a device for detecting load which acts to the valve stem 2 as torque of the valve drive means 6; and a device for detecting it as reaction force to thrust which acts to the valve stem 2.

At present, there is generally a device for detecting load which acts to a valve stem as torque of a valve drive device, and a device which detects load torque which acts to a valve stem on the basis of displacement of a worm by using a reduction gear having a worm gear mechanism is widely used. In the meantime, it is known to provide means for detecting thrust which acts to a valve stem as reaction force by attaching a strain gauge 8 to a valve yoke though it is not so widely used.

But, in the device for detecting load torque which acts to a valve stem on the basis of displacement of the worm in the worm gear mechanism, it is necessary to provide torque detecting means in the valve drive means 6, so that the valve drive device 6 becomes complicate and requires high cost for manufacturing.

In the device in which the strain gauge 8 is attached to the valve yoke 4 to detect thrust which acts to the valve stem 2 as reaction force, the valve yoke 4 has complicate structure and is used without mechanical processing as casting surface, so that the yoke sectional area is variable, so that it is difficult to detect thrust force accurately even if the strain gauge 8 is directly attached to the valve yoke 4.

To diagnose deterioration of the valve body 1 or the valve drive device 6 to presume the remaining life, it is insufficient as diagnosis information to know one of torque and thrust, and it is necessary to detect both torque and thrust at the same time.

For example, even if thrust which acts to the gate valve type valve stem 2 is only detected, it is possible to diagnose the valve body 1 itself at some extent, and it is insufficient to diagnose the valve drive device 6 because disorder is detected by thrust of the valve stem 2 even if there is disorder in the gear or bearing in the valve drive device 6. On the contrary, even if only drive torque of the valve drive device 6 is detected, it could not be judged whether the disorder is found in the valve body 1 or inside of the valve drive device 6. Therefore, in both cases that the valve stem 2 is rotated or moved up and down, it is advantageous to detect torque and thrust at the same time for accurate diagnosis.

By combining conventional torque detecting means with thrust detecting means, it is possible to detect torque and thrust at the same time, but the structure and handling thereof become complicate, which is not practically employed.

Further the torque of the valve drive device 6 is not related with the thrust which acts to the valve stem 2, but one of them is theoretically known, so that the other can be found by calculation. However, coefficient of friction is required in the calculation. The coefficient of friction is variable depending on environmental condition and deterioration, but cannot be actually calculated accurately. There is quite different meaning between the case wherein one is measured, the other being calculated, and the case wherein both are measured at the same time.

SUMMARY OF THE INVENTION

In view of the foregoing disadvantages in the prior art, it is an object of the present invention to provide a load detectable valve in which load which acts to a valve stem, especially torque and thrust, can be detected accurately.

According to the present invention, there is provided a load detectable valve comprising a valve body which comprises a valve element and a valve casing; a valve stem which projects upwards from the valve body; valve drive means provided above the valve body for driving the valve stem; and a hollow cylinder provided concentrically to the valve stem between the valve body and the valve drive means to connect them, the hollow cylinder having a strain gauge for detecting strain.

When thrust or torque acts to the valve stem, reaction force generates in the homogeneous hollow cylinder and strain generates by the reaction force. By determining the strain by strain gauges, load which acts to the valve stem is obtained. Without disassembling the valve, deterioration can be rapidly found.

Thrust and torque which act to the valve stem are both detected exactly at the same time, so that deterioration of the valve can be exactly found and remaining life can be surely known.

BRIEF DESCRIPTION OF THE DRAWINGS

The features and advantages of the present invention will become more apparent from the following description with respect to embodiments on the basis of appended drawings wherein.

DETAILED DESCRIPTION OF PREFERRED EMBODIMENT

Figure 1:
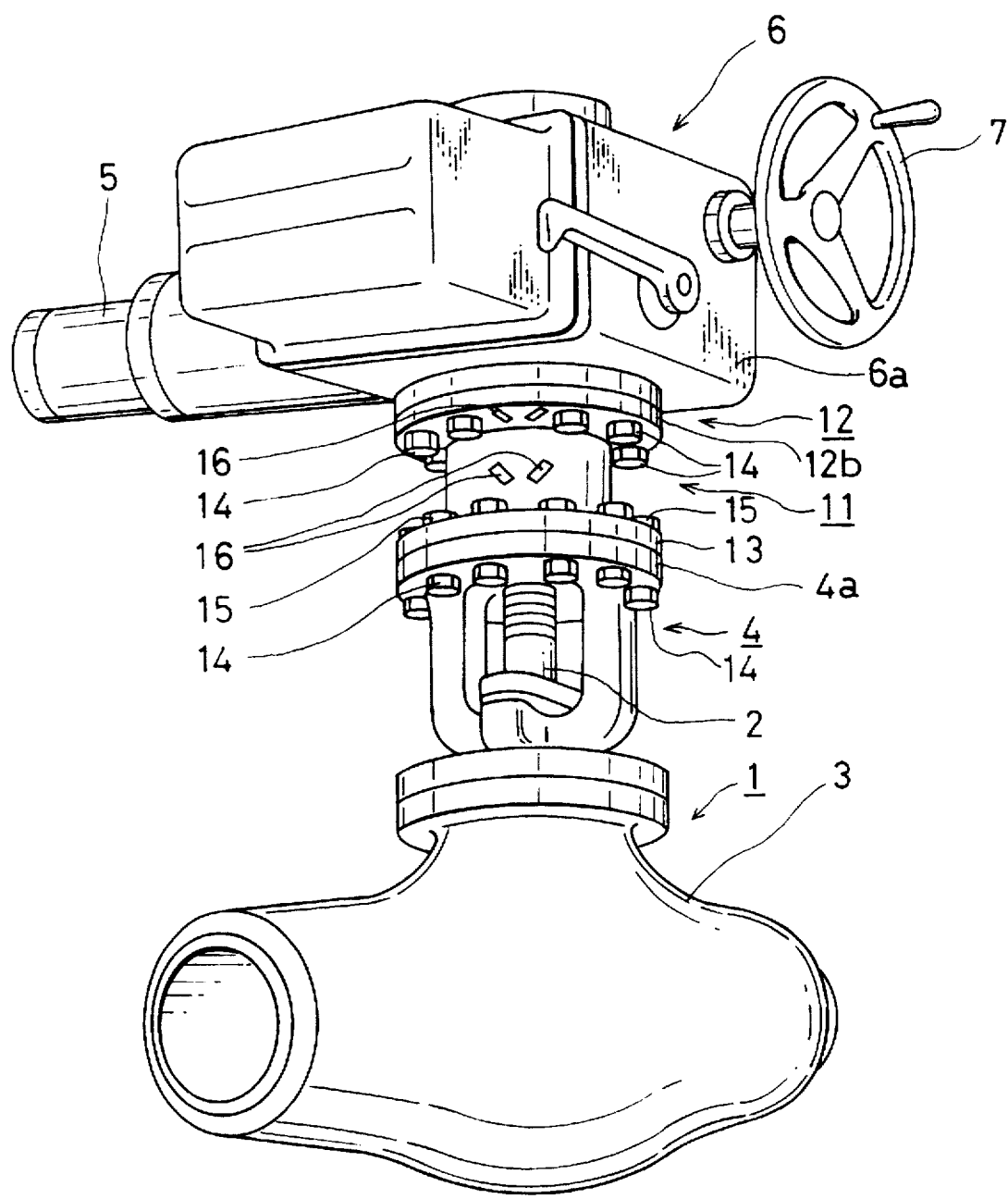
FIG. 1 is a perspective view of one embodiment of a load detectable valve according to the present invention.
Figure 2:
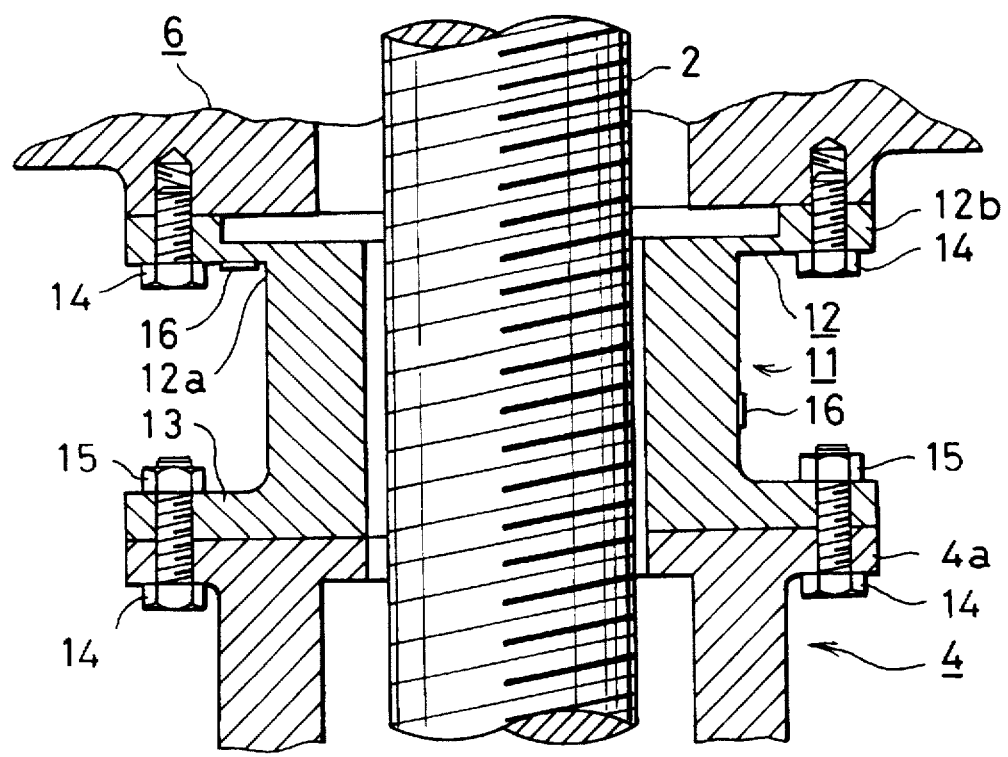
FIG. 2 is an enlarged longitudinal sectional front view of the main portion of the load detectable valve according to the present invention.
Figure 3:
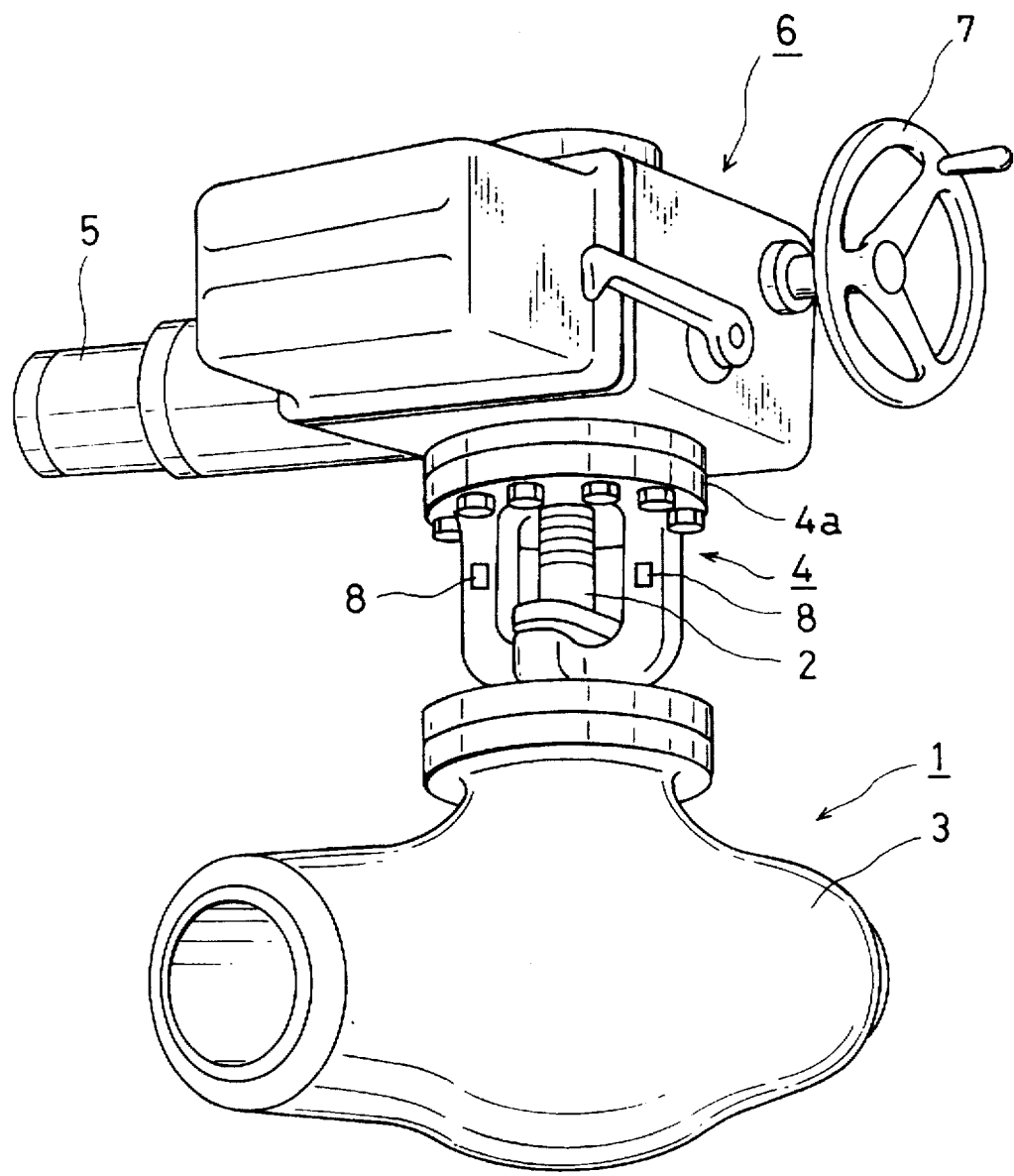
FIG. 3 is a perspective view of a conventional device.

One embodiment of the present invention will be described with respect to FIGS. 1 and 2. The same numerals are allotted to the same members as those of a conventional device in FIG. 3, and the detailed description thereof will be omitted.

In this embodiment, a valve body 1 and a valve drive device 6 are the same as conventional ones, and are connected by a hollow cylinder 11 made of homogenous material which is concentric with a valve stem 2. Outer flanges 12 and 13 are formed at the upper and lower ends of the hollow cylinder 11, and a thinner annular portion 12a is formed at the inside of the upper flange 12. A thicker outer circumferential portion 12b of the upper flange 12 is fixed to the lower surface of a casing 6a of the valve drive device 6 by a bolt 14. The lower flange 13 is fixed to the upper surface of a valve yoke 4 by a bolt 14 and a nut 15.

In the thinner annular portion 12a of the upper flange 12 and in the middle of the outer circumferential surface of the hollow cylinder 11, there are attached two strain gauges 16 for detecting load in inclined form respectively.

In this embodiment, thrust acts to the valve stem 2, and as reaction, contrary thrust generates in the hollow cylinder, thereby generating strain in the thinner annular portion 12a of the upper flange 12. Therefore, determination of strain by the strain gauge 16 allows thrust which acts the valve stem 2 to be detected exactly.

Both thrust and torque which act to the valve stem 2 are exactly detected at the same time, and deterioration of the valve drive device 6 is exactly known, thereby enabling suitable diagnosis.

In the foregoing embodiment, the present invention is applied to a gauge valve in which the valve stem 2 moves up and down to open and close the valve, but may be applied to a butterfly valve in which a valve stem is rotated without moving up and down to open and close a valve, or a valve in which a valve stem moves up and down while it rotates to open and close a valve.

If the valve stem 2 only moves up and down or rotates, the strain gauge 16 is provided only on the thinner annual portion 12a of the hollow cylinder 11 or only in the middle of the outer circumferential surface, and only thrust or torque of the valve stem may be exactly determined.

The foregoings merely relate to preferred embodiment of the present invention. Various changes and modifications may be made by person skilled in the art without departing from the scope of claims wherein:

What is claimed is:

1. A load detectable valve comprising:

a valve body which comprises a valve element and a valve casing;

a valve stem which projects upwards from the valve body;

valve drive means provided above the valve body for driving the valve stem; and a hollow cylinder provided concentrically to the valve stem between the valve body and the valve drive means to connect them, the hollow cylinder having a thinner annular flange fixed to the valve drive means, a first detecting means which comprises two strain gauges being attached on the annular flange of the hollow cylinder to detect thrust which acts on the valve stem, a second detecting means which comprises two strain gauges being attached on an outer circumferential surface of the hollow cylinder to detect torque which acts on the valve stem, thereby determining extent of deterioration of the valve precisely.

2. A load detectable valve as defined in claim 1 wherein the valve is opened and closed by moving the valve stem up and down by the valve drive means.

3. A load detectable valve as defined in claim 1 wherein the valve is opened and closed by rotating the valve stem in regular and reverse directions by the valve drive means.

4. A load detectable valve as defined in claim 1 wherein the valve body comprises a valve yoke which surrounds the valve stem, an upper end of the valve yoke being connected with a lower end of the hollow cylinder.

* * * * *